US008485238B2

(12) United States Patent
Hirata

(10) Patent No.: US 8,485,238 B2
(45) Date of Patent: Jul. 16, 2013

(54) STAMPING-LAMINATING APPARATUS AND METHOD

(75) Inventor: Kazuyuki Hirata, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 89 days.

(21) Appl. No.: 13/090,341

(22) Filed: Apr. 20, 2011

(65) Prior Publication Data

US 2011/0277939 A1   Nov. 17, 2011

(30) Foreign Application Priority Data

May 12, 2010   (JP) .................................. 2010-110248

(51) Int. Cl.
*B29C 65/00* (2006.01)
*B32B 37/00* (2006.01)
*B32B 38/04* (2006.01)
*B32B 38/10* (2006.01)

(52) U.S. Cl.
USPC ........................................ 156/512; 156/353

(58) Field of Classification Search
USPC ..... 156/512, 513, 252, 265, 264, 353; 83/622
See application file for complete search history.

(56) References Cited

U.S. PATENT DOCUMENTS

| 4,220,062 A * | 9/1980 | Blanz .............................. 83/76.6 |
| 2009/0152249 A1 | 6/2009 | Petro et al. |
| 2011/0079122 A1 | 4/2011 | Hirata |

FOREIGN PATENT DOCUMENTS

JP   2006-026735   2/2006

OTHER PUBLICATIONS

U.S. Appl. No. 13/084,824 to Kazuyuki Hirata, filed Apr. 12, 2011.
Chinese Office Action in counterpart application No. 201110120223.8 dated Feb. 18, 2013 (and English-language translation thereof) and corresponding search report.

* cited by examiner

*Primary Examiner* — Linda L Gray
(74) *Attorney, Agent, or Firm* — Greenblum & Bernstein, P.L.C.

(57) ABSTRACT

Punching structures each include a die, a punch that cooperates with the die to stamp a workpiece, a die supporting member that applies lateral pressure to core pieces stamped out from the workpiece, and a counter pressure applying mechanism that applies counter pressure toward the punch to the core pieces from the side opposite to the punch. The punching structures also include selecting mechanisms, respectively. The punching structures laminate core pieces while applying lateral pressure and counter pressure to the core pieces. The punching structures are arranged along the conveyance direction of the workpiece. The selecting mechanisms select one of the punching structures to be put in a pause state, so that one of the punching structures is put in a pause state during a stamping operation of the punching structures.

5 Claims, 12 Drawing Sheets

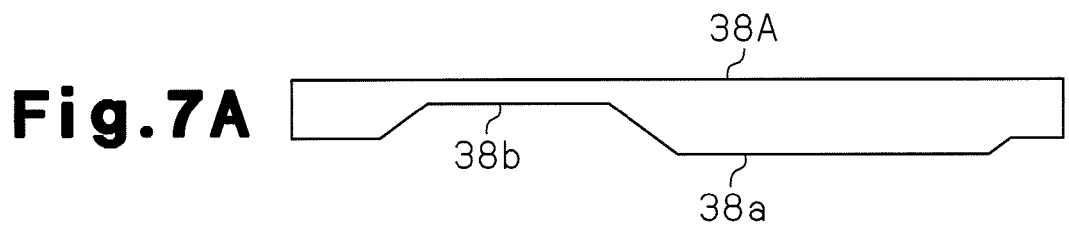
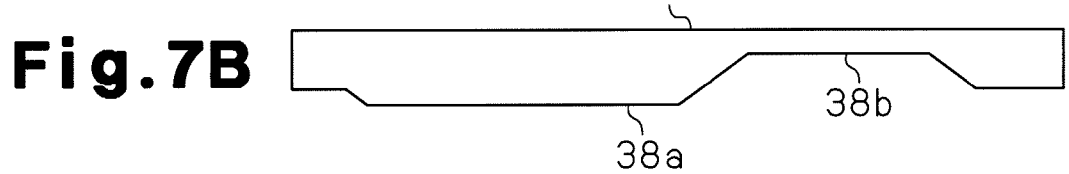
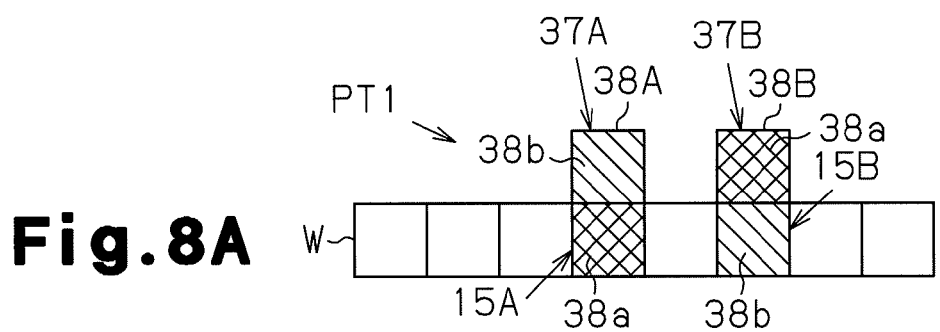
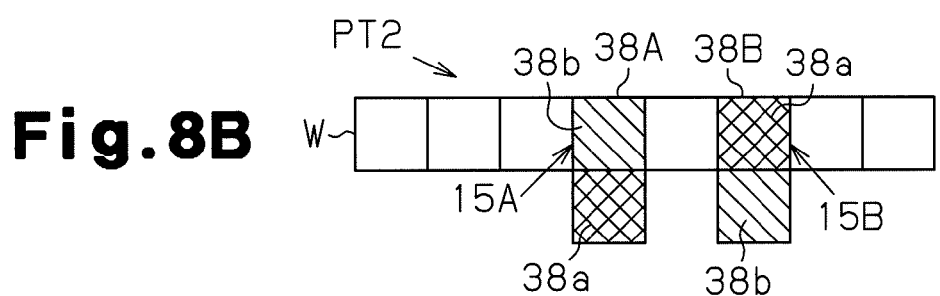

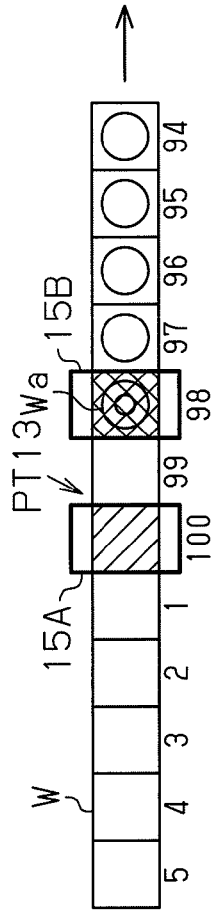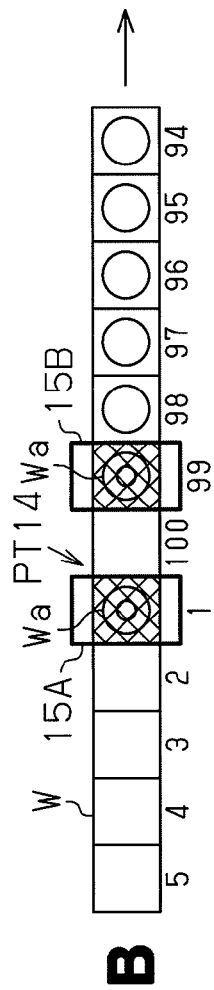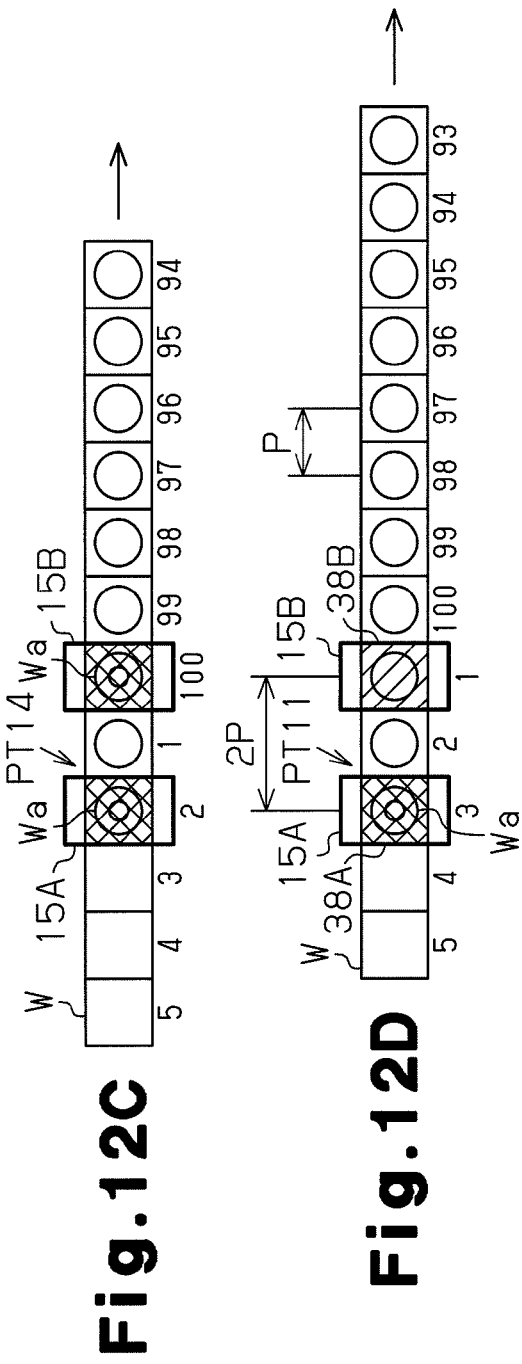

STAMPING-LAMINATING APPARATUS AND METHOD

BACKGROUND OF THE INVENTION

The present invention relates to a stamping-laminating apparatus and method adapted for manufacturing motor cores to consecutively stamping out core pieces from workpieces such as a hoop material and to laminate a predetermined number of core pieces per unit.

Such a stamping-laminating apparatus is disclosed in Japanese Laid-Open Patent Publication No. 2006-26735. The stamping-laminating apparatus includes a die and a punch. The punch is movably arranged along the same axis as the die and faces the upper surface of the die. A lateral pressure ring is arranged below the die. The lateral pressure ring is also arranged on the same axis as the die and located adjacent to the die. When the punch is lowered toward the die, a core piece is stamped out of a workpiece. The lateral pressure ring applies lateral pressure to a plurality of core pieces. A predetermined number of core pieces are laminated inside the lateral pressure ring. According to the method, lateral pressure is applied to the outer circumferential surfaces of the core pieces when the core pieces are laminated. This can bend the laminated core pieces so that the upper surface is concave. As a result, the flatness of the core pieces is degraded, and product accuracy may deteriorate.

To solve such problems, the stamping-laminating apparatus disclosed in Japanese Laid-Open Patent Publication No. 2006-26735 has a counter pressure applying mechanism below a die. The counter pressure applying mechanism applies a counter pressure toward the punch (upward) to stamped and laminated pieces from the side opposite to the punch (from below). This suppresses bending of the core pieces. In this stamping-laminating apparatus, a product discharging mechanism is arranged below the die. When a predetermined number of core pieces are laminated, the laminated core pieces are lowered to a position that corresponds to the product discharging mechanism, while being supported by the counter pressure applying mechanism. Thereafter, the product discharging mechanism discharges the laminated core pieces from the position on the counter pressure applying mechanism to a side.

According to the stamping-laminating apparatus, core pieces keep being stamped out and laminated during the period in which other laminated core pieces are lowered and discharged by the produce discharging mechanism while being supported by the counter pressure applying mechanism. In this case, the core pieces that are being machined do not receive counter pressure while the counter pressure applying mechanism is lowered. As a result, the curvature of the core pieces is changed, which lowers the product accuracy. To avoid such a drawback, stamping and laminating of core pieces need to be suspended during a period in which laminated core pieces are discharged. However, the discharge of laminated core pieces takes a certain amount of time. Therefore, if machining of core pieces is suspended during discharge of other core pieces, productivity will be lowered significantly.

SUMMARY OF THE INVENTION

Accordingly, it is an objective of the present invention to provide a stamping-laminating apparatus and a stamping-laminating method that are capable of continuing to stamp workpieces and laminate stamped pieces without degrading the product accuracy even during discharge of stamped and laminated pieces, thereby improving productivity.

To achieve the foregoing objective and in accordance with a first aspect of the present invention, a stamping-laminating apparatus forming stamped pieces from a workpiece is provided. The apparatus includes a punching structure, a lateral pressure ring, and a counter pressure applying mechanism. The punching structure includes a die, a punch that cooperates with the die to stamp a workpiece. The lateral pressure ring applies lateral pressure to stamped pieces punched out from the workpiece. The counter pressure applying mechanism applies, to the stamped pieces, counter pressure toward the punch from the side opposite to the punch. The workpiece is intermittently conveyed in one direction by a predetermined pitch, and the apparatus laminates the stamped pieces while applying the lateral pressure and the counter pressure to the stamped pieces. A plurality of the punching structures are included. The apparatus further includes a selecting mechanism that selects a punching structure to be put in a pause state such that, among the punching structures, at least one punching structure is in a pause state during a stamping operation.

In accordance with a second aspect of the present invention, a stamping-laminating method for stamping a workpiece is provided. The method includes: conveying a workpiece by a predetermined pitch in one direction while using plurality of punching structures arranged along said direction, in which each punching structure include a die and a punch, to stamp pieces out from the workpiece; laminating the pieces stamped out while applying lateral pressure to the stamped pieces when being laminated, and applying counter pressure to the stamped pieces toward each punch from the side opposite to the punch; and selecting a punching structure to be put in a pause state such that, among the punching structures, at least one punching structure is in a pause state during a stamping operation.

BRIEF DESCRIPTION OF THE DRAWINGS

FIGS. 7A and 7B are side views each illustrating a selection switching cam of a stamping structure;

FIGS. 8A and 8B are schematic plan views illustrating switching patterns of the selection switching cams;

FIGS. 12A to 12D are explanatory diagrams showing stamping of workpieces;

DETAILED DESCRIPTION OF THE PREFERRED EMBODIMENTS

A preferred embodiment of the present invention will now be described. First, a description is given of the structure and assembling method of a motor core that is assembled by a laminating apparatus of the present embodiment.

Figure 1:
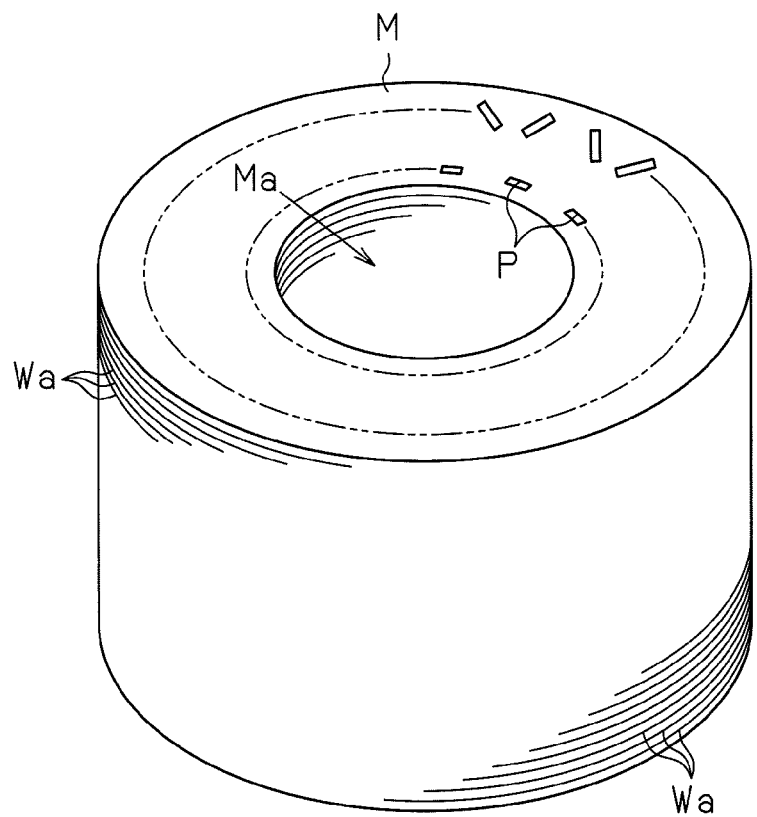
FIG. 1 is a perspective view illustrating a motor core.
Figure 2:
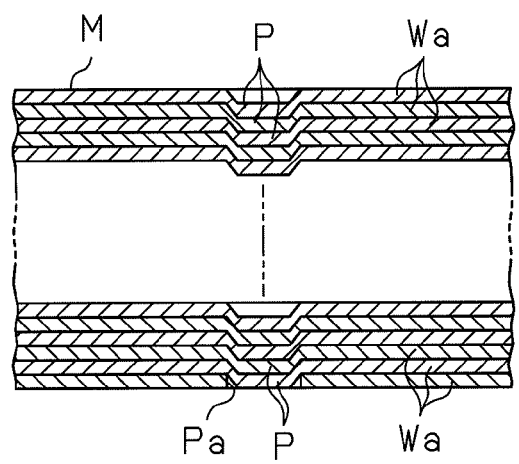
FIG. 2 is a partial cross-sectional view of the motor core.
Figure 3:
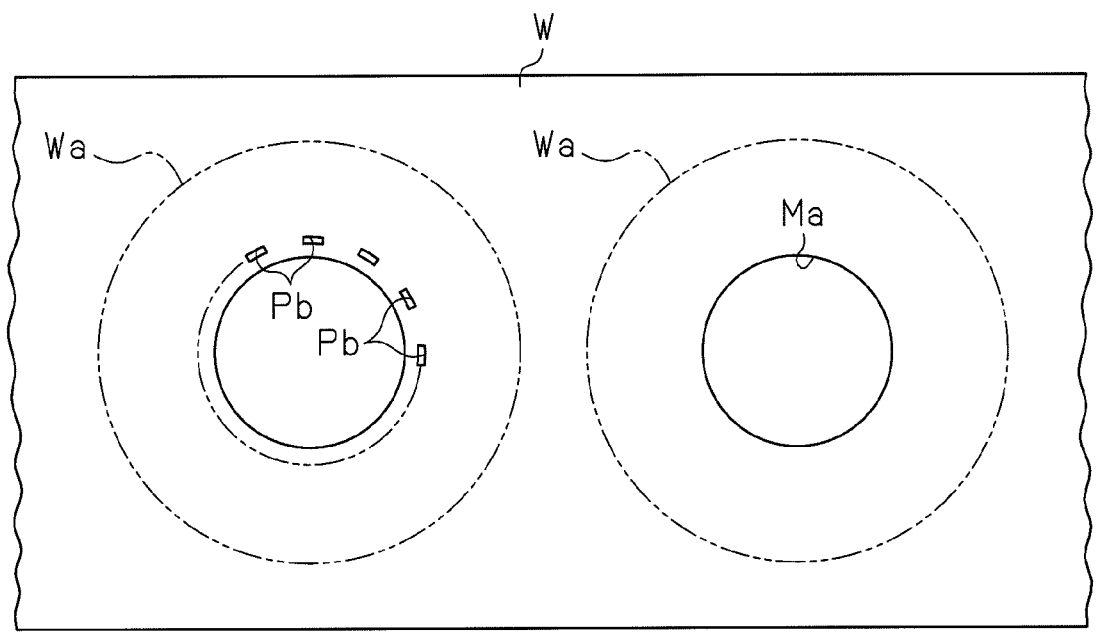
FIG. 3 is a partial plan view showing hoop material.

A motor core M shown in FIGS. 1 to 3 is formed by consecutively stamping out a predetermined number of core pieces Wa from a workpiece W, which is a metal hoop material, and laminating a plurality of core pieces Wa. Protrusions Pa are formed in parts of each core piece Wa. The protrusions Pa of each core piece Wa are engaged with recesses on the back face of the adjacent core piece Wa. Accordingly, a number of core pieces Wa are coupled together while being laminated. Every nth one laminated core pieces Wa has holes Pb instead of protrusions Pa, where n is a predetermined number. When the protrusions Pa are fitted in the holes Pb of an adjacent core piece Wa, the core piece Wa with the holes Pb is not engaged with the other adjacent core pieces Wa. In this manner, the laminated core pieces Wa form separate groups at each nth core piece Wa. The motor core M is formed by a group of the predetermined laminated core pieces Wa. In the present embodiment, the predetermined number is one hundred.

When core pieces Wa are stamped, holes Pb are stamped out in each nth core piece Wa, instead of protrusions Pa. As shown in FIG. 3, the holes Pb are formed in advance at positions in part of the workpiece W that corresponds to a core piece Wa. No holes Pb are formed in a part that corresponds to a core piece Wa with protrusions Pa. Thereafter, in a process for forming protrusions Pa, the punching die blank-stamps, or passes through the holes Pb in a core piece Wa in which the holes Pb have been formed. Therefore, protrusions Pa are not formed in the parts where the holes Pb have been formed in the workpiece W.

First Embodiment

A first embodiment of the present invention will now be described with reference to FIGS. 4 to 9B.

Figure 4:
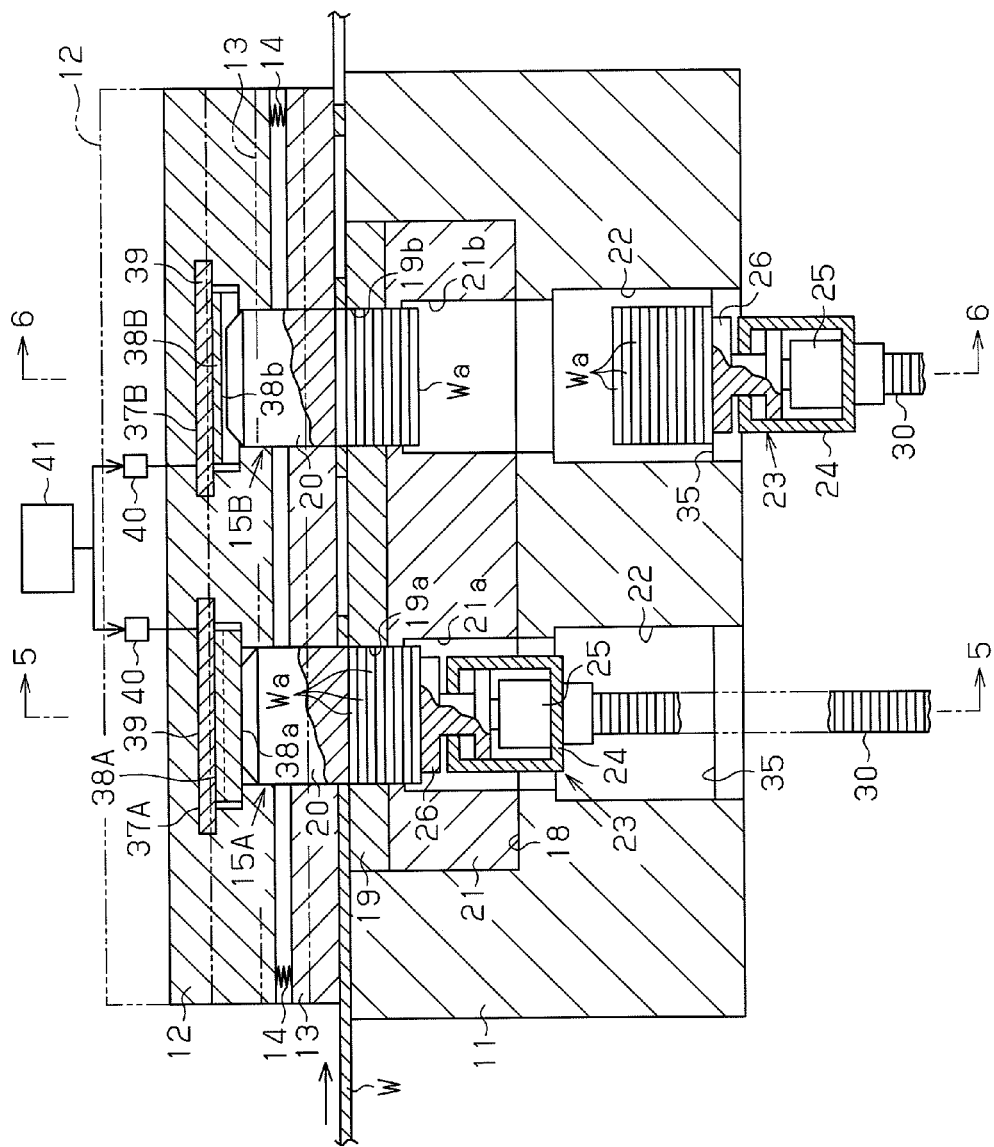
FIG. 4 is a cross-sectional view illustrating a stamping-laminating apparatus according to a first embodiment of the present invention.
Figure 5:
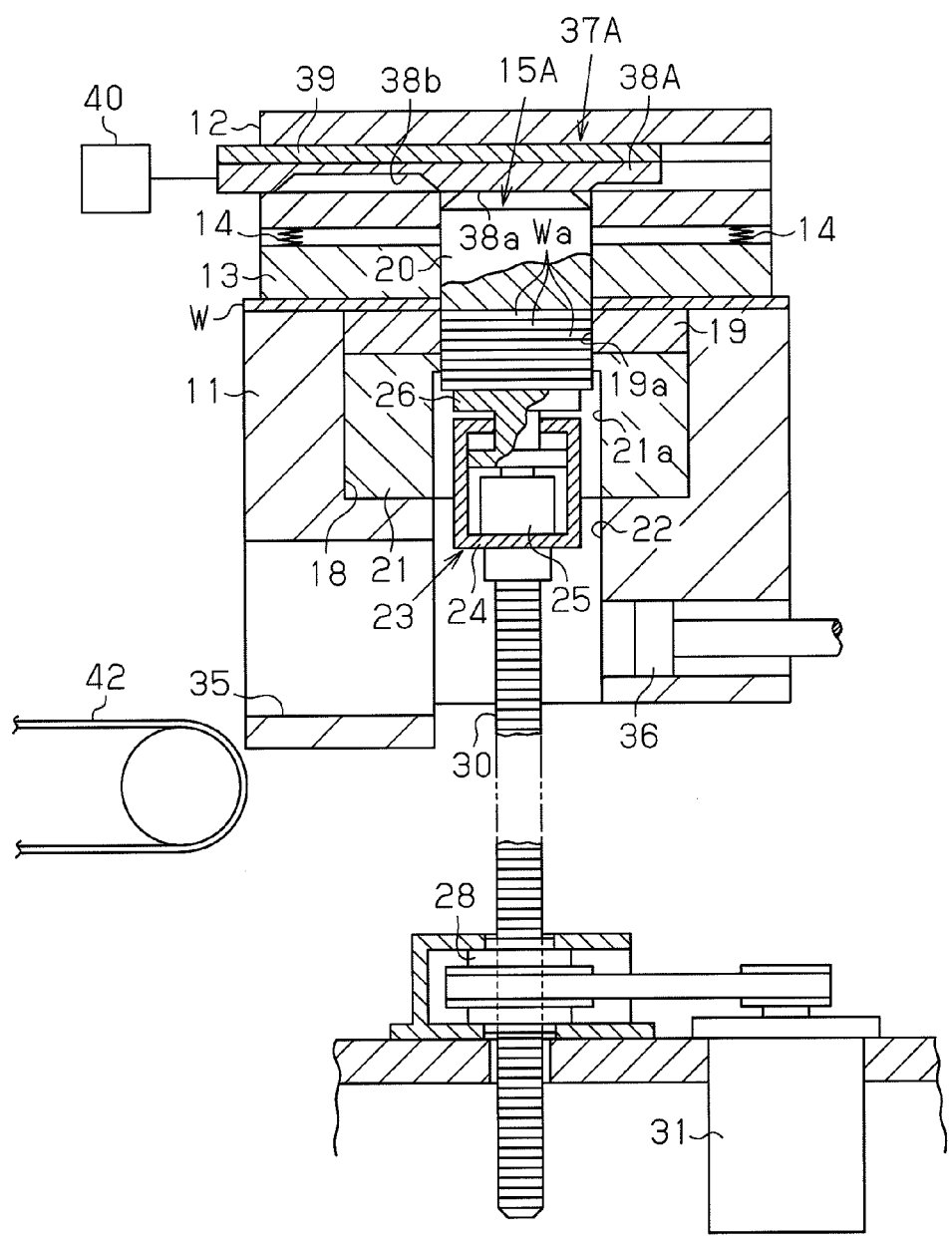
FIG. 5 is a cross-sectional view taken along line 5-5 of FIG. 4.
Figure 6:
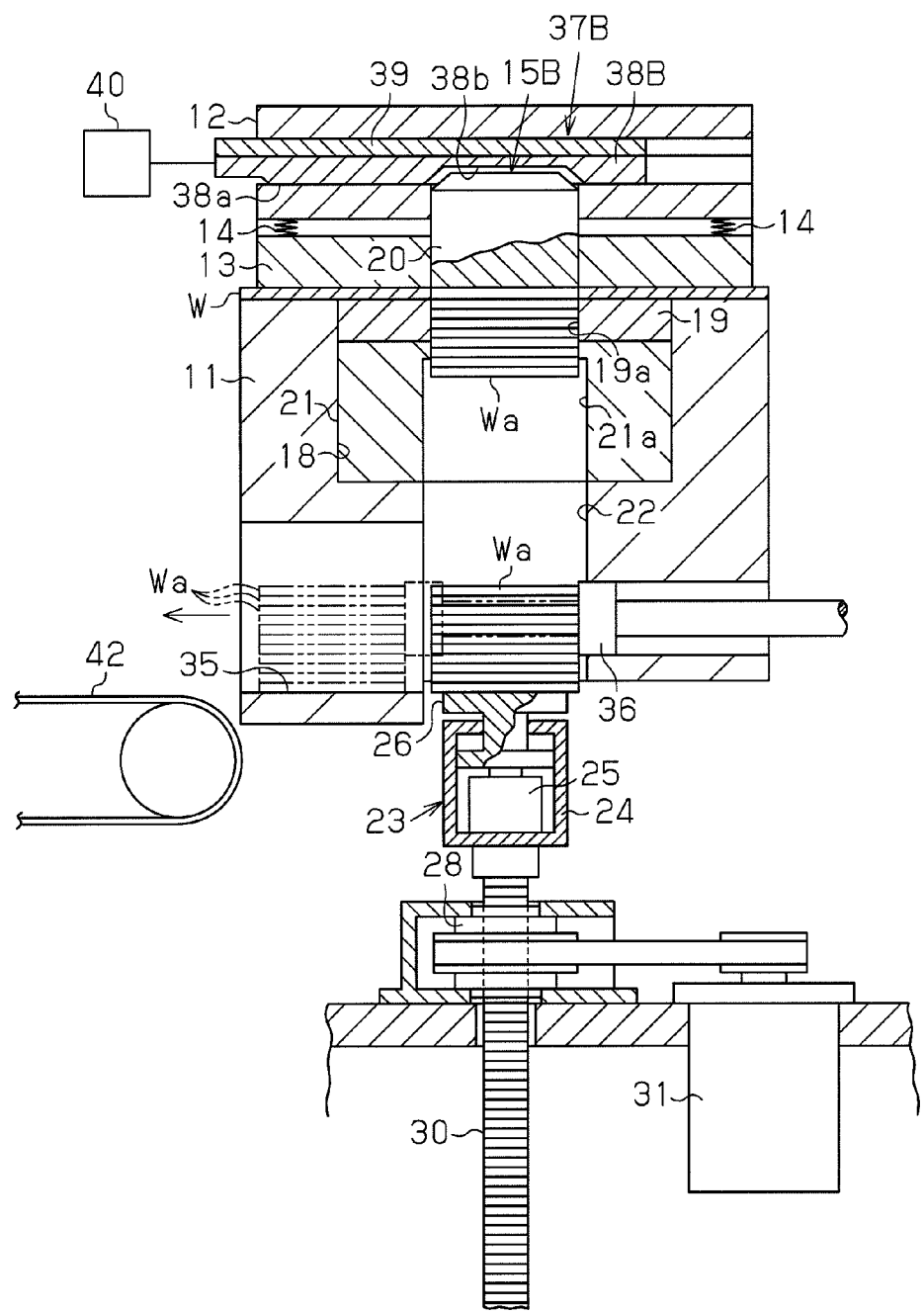
FIG. 6 is a cross-sectional view taken along line 6-6 of FIG. 4.

As shown in FIGS. 4 to 6, a stamping-laminating apparatus includes a workpiece support 11 for supporting a workpiece W. The workpiece W is conveyed along one direction (direction the arrow in FIG. 4) by the workpiece support 11. A lift member 12, which serves as lift means, is provided above the workpiece support 11. A holding member 13 is supported on the lower face of the lift member 12 with springs 14. The holding member 13 is movable relative to the lift member 12 along the direction in which the lift member 12 is lifted and lowered. The springs 14 urge the holding member 13 downward. With the workpiece W placed thereon, the workpiece support 11 is tightly held between the holding member 13 and the workpiece support 11 when the lift member 12 is lowered.

Figure 9A:
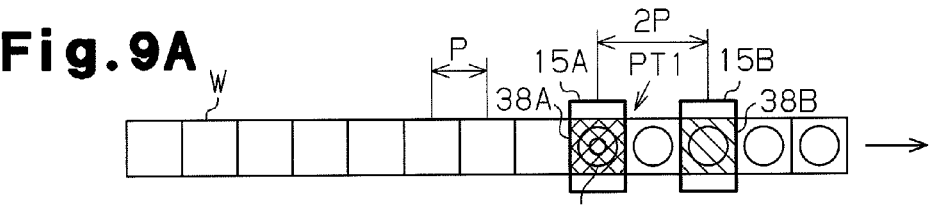
FIGS. 9A and 9B are explanatory diagrams showing stamping of workpieces.
Figure 9B:
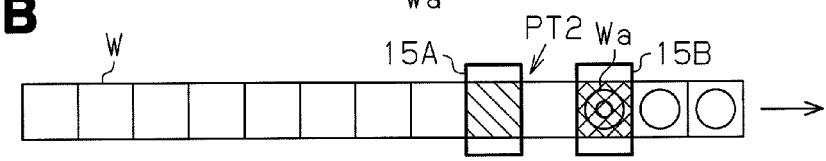

Two punching structures 15A, 15B, which serve as punching means, are located between the workpiece support 11 and the lift member 12. The punching structures 15A, 15B are arranged along the conveyance direction of the workpiece W. In the present embodiment, the workpiece W is intermittently and consecutively conveyed in one direction by a predetermined conveyance pitch P as shown in FIGS. 9A and 9B. The punching structures 15A, 15B are located at an interval 2P, which is twice the conveyance pitch P for the workpiece W.

The punching structures 15A, 15B consecutively stamp core pieces Wa for motor cores from the workpiece W. Simultaneously, a number of core pieces Wa are laminated while receiving lateral pressure and counter pressure (pressure from below).

The configuration of the punching structures 15A, 15B will now be described.

A recess 18 is formed in the upper face of the workpiece support 11. A die supporting member 21 is arranged in the recess 18 of the workpiece support 11. A die 19 is located on the upper face of the die supporting member 21 in the recess 18 of the workpiece support 11. The die 19 has a pair of stamping holes 19a, 19b that correspond to the punching structures 15A, 15B, respectively. The stamping holes 19a, 19b are each arranged coaxially with the corresponding one of the punching structures 15A, 15B. A pair of punches 20 are supported below the lift member 12. Each punch 20 is moved relative to the die 19 along the same axis of the corresponding one of the stamping holes 19a, 19b. When the lift member 12 is lowered, the punches 20 and the stamping holes 19a, 19b of the die 19 stamp core pieces Wa from the workpiece W.

A pair of through holes 21a, 21b are formed in the die supporting member 21. The through hole 21a is formed to be continuous to the stamping hole 19a of the die 19. The through hole 21b is formed to be continuous to the stamping hole 19b of the die 19. The diameter at the upper ends of the through holes 21a, 21b is equal to the diameter of the stamping holes 19a, 19b. The core pieces Wa are stamped out of the workpiece W and pushed downward to pass the stamping holes 19a, 19b of the die 19 and the through holes 21a, 21b of the die supporting member 21. At this time, the outer circumferential surfaces of the core pieces Wa receive lateral pressure. The lateral pressure laminates a plurality of core pieces Wa. The distance in which the circumferential surfaces of the stamping hole 19a, 19b and the through holes 21a, 21b apply lateral pressure is set shorter than the height of the motor core M having a predetermined number of core pieces Wa.

A pair of holes 22 are formed in the lower part of the workpiece support 11. The holes 22 each communicate with one of the through holes 21a, 21b of the die supporting member 21. The diameter of the holes 22 is greater than the diameter at the lower ends of the through holes 21a, 21b. A counter pressure applying mechanism 23 is arranged in each hole 22 to be lifted and lowered. The counter pressure applying mechanism 23 applies counter pressure toward the punch 20 to the laminated core pieces Wa from a side opposite to the punch 20. This prevents the upper surfaces of the laminated core pieces Wa from being becoming concave.

Each counter pressure applying mechanism 23 includes a supporting frame 24 and a supporting member 26. The supporting frame 24 is located at the upper end of a ball screw 30, and the supporting member 26 is supported on the supporting frame 24 with a gas spring 25 to be lifted and lowered. After being stamped out of the workpiece W, core pieces Wa are laminated inside the through holes 21a, 21b of the die supporting member 21 and supported on the supporting member 26. In this state, when the punches 20 are lifted from the stamping holes 19a, 19b of the die 19 and separate from the die 19, the supporting member 26 is lifted to a position at the same level as the upper face of the die 19 by the force of the gas spring 25, while supporting the core pieces Wa. In contrast, when the punches 20 are lowered to punch core pieces Wa out of the workpiece W, the supporting member 26 is pushed down against the force of the gas spring 25 together with the laminated core pieces Wa.

As shown in FIGS. 5 and 6, a motor 31 is located below the workpiece support 11. When the motor 31 is activated, a nut 28 is rotated. Accordingly, the ball screw 30 threaded to the nut 28 is lifted or lowered, so that the counter pressure applying mechanism 23 is lifted or lowered. As a result, the position of the supporting member 26 is adjusted before the core pieces Wa are stamped out of the workpiece W, so that the upper face of the uppermost core piece Wa in each of the through holes 21a, 21b is at the same level as the upper face of the die 19. When a predetermined number of core pieces Wa are laminated on the supporting member 26, the motor 31 is activated to lower the counter pressure applying mechanism 23 as shown in FIG. 6. The laminated core pieces Wa are placed at a product discharging position in the vicinity of the lower end of the through hole 22. After being placed at the product discharging position, the core pieces Wa are discharged to a discharging conveyer 42 from the supporting member 26 through the product discharging port 35 by a pusher 36.

Selecting mechanisms 37A, 37B are arranged above the punching structures 15A, 15B. The selecting mechanisms 37A, 37B serve as selecting means that selects the punching structures 15A, 15B to be put in a pause state. During a stamping operation, when the selecting mechanisms 37A, 37B select punching structures 15A, 15B to be put in a pause state, laminated core pieces Wa are discharged on the side of one of the punching structures 15A, 15B that is put in a pause state.

Selection switching cams 38A, 38B attached to attachment plates 39 are arranged above the workpiece support 11. Each selection switching cam 38A, 38B is supported to be movable in a direction perpendicular to the direction in which the punches 20 are lifted and lowered. As shown in FIGS. 5 and 7A, the punching structure 15A is located on the upstream side with respect to the conveyance direction of the workpiece W. The selecting mechanism 37A is arranged to correspond to the punching structure 15A. A protruding cam surface 38a, serving as a constraining portion, and a recessed cam surface 38b, serving as a permitting portion, are formed on the lower face of the selection switching cam 38A of the selecting mechanism 37A. The protruding cam surface 38a and the recessed cam surface 38b are arranged along the conveyance direction of the selection switching cam 38A. As shown in FIGS. 6 and 7B, the punching structure 15B is located on the downstream side with respect to the conveyance direction of the workpiece W. The selecting mechanism 37B is arranged to correspond to the punching structure 15B. A recessed cam surface 38b and a protruding cam surface 38a are formed on the lower face of the selection switching cam 38B of the selecting mechanism 37B. The recessed cam surface 38b and the protruding cam surface 38a are arranged in the inverse order of that in the selection switching cam 38A.

The left side of FIG. 4 and FIG. 5 illustrate a state in which the protruding cam surfaces 38a of the selection switching cams 38A, 38B have been switched to positions that correspond to the punch 20 of the punching structures 15A, 15B. In this case, as the lift 12 is lowered, the punch 20 is pushed by the protruding cam surface 38a. In other words, upward movement of the punch 20 relative to the lift 12 is constrained, so that the punch 20 is lowered together with the lift 12 to punch the workpiece W. In contrast, the right side of FIG. 4 and FIG. 6 illustrate a state in which the recessed cam surface 38b of the selection switching cams 38A, 38B has been switched to a position that corresponds to the punch 20 of the punching structures 15A, 15B. In this case, as the lift 12 is lowered, the punch 20 contacts upper surface of the workpiece W. This stops the descent of the punch 20. As a result, the punch 20 enters the recessed cam surface 38b to be lifted relative to the lift 12. The punch 20 therefore does not punch the workpiece W.

As shown in FIG. 4, each of the selection switching cams 38A, 38B is connected to an actuator 40 formed of a solenoid. The actuator 40 serves as actuating means. The actuators 40 switch the selection switching cam 38A, 38B between two positions. The actuators 40 are controlled by a controller 41 to switch the operation of the selection switching cams 38A, 38B. The combination of the switching states creates a plurality of (two, in the present embodiment) switching patterns PT1, PT2 as shown in FIGS. 8A and 8B.

In the first switching pattern PT1 shown in FIG. 8A, the selection switching cam 38A of the selecting mechanism 37A is at a stamping position, where the protruding cam surface 38a corresponds to the punch 20, and the selection switching cam 38B of the selecting mechanism 37B is at a pause position, where the recessed cam surface 38b corresponds to the punch 20. In the second switching pattern PT2 shown in FIG. 8B, the selection switching cam 38A is at a pause position, where the recessed cam surface 38b corresponds to the punch 20, and the selection switching cam 38B is at a stamping position, where the protruding cam surface 38a corresponds to the punch 20.

An operation of the above stamping-laminating apparatus device will now be described.

During a stamping operation, each time a workpiece W is intermittently conveyed by the conveyance pitch P, the operation shown in FIGS. 9A and 9B is executed. Therefore, the upstream and downstream punching structures 15a, 15B arranged along the conveyance direction of the workpiece W perform stamping or are put in a pause state, so as to consecutively stamp core pieces Wa from the workpiece W. FIGS. 9A and 9B schematically show a stamping operation. Circles show holes that have been already stamped, and double circles show a position where punching is performed.

In the case of FIG. 9A, the selection switching cams 38A, 38B of the selecting mechanisms 37A, 37B are switched to the first switching pattern PT1 shown in FIG. 8A. Accordingly, the upstream punching structure 15A consecutively performs punching a predetermined number of times. During the stamping operation of the punching structure 15A, the downstream punching structure 15B is in a pause state. In the case of FIG. 93, the selection switching cams 38A, 38B of the selecting mechanisms 37A, 37B are switched to the second switching pattern PT2 shown in FIG. 8B. Thus, the upstream punching structure 15A is in a pause state. While the punching structure 15A is in a pause state, the downstream punching structure 15B performs consecutive punching a predetermined number of times.

During the stamping operation of each of the punching structures 15A, 15B, the protruding cam surface 38a of the selection switching cams 38A, 38B is at a position corresponding to the punch 20 as shown in the left side of FIG. 4 and FIG. 5. In this state, the lift 12 is lowered toward the workpiece W on the workpiece support 11. At this time, the punch 20 is lowered together with the lift 12. Then, the punch 20 and the stamping holes 19a, 19b of the die 19 stamp core pieces Wa from the workpiece W. The stamped core pieces Wa pass the stamping holes 19a, 19b of the die 19 and are pushed up into the through holes 21a, 21b of the die supporting member 21. The core pieces Wa are laminated by lateral pressure applied from the circumferential surfaces of the through holes 21a, 21b.

When the punch 20 returns to the original position after stamping the workpiece W, the core pieces Wa are pushed up by the counter pressure applying mechanism 23. The upper face of the uppermost core piece Wa in the laminated core pieces Wa is at the same level as the upper face of the die 19. When the core pieces Wa are stamped, the laminated core pieces Wa receive pressure in a direction opposite the direction of pressure when the core pieces Wa are stamped. Therefore, at stamping of the core pieces Wa, even if the laminated core pieces Wa receive lateral pressure from the circumferential surfaces of the through holes 21*a*, 21*b*, the upper surfaces of the core pieces Wa do not become concave. The stamping and laminating of the core pieces Wa are performed with a high precision.

When stamping of core pieces Wa from the workpiece W and lamination of workpieces Wa are performed, and a predetermined number (100) of core pieces Wa are laminated, the stamping operation of core pieces Wa is suspended. Then, as shown in the right side of FIG. 4 and FIG. 6, the counter pressure applying mechanisms 23 is lowered so that the core pieces Wa on the supporting member 26 are moved downward and placed on the product discharging position. The laminated core pieces Wa to be discharged are core pieces that were laminated in a cycle preceding the cycle immediately before the one in which the stamping has been suspended. Thereafter, the laminated core pieces Wa are moved to the discharging conveyer 42 from the supporting member 26 of the counter pressure applying mechanism 23 through the product discharging port 35 by the pusher 36. In this case, the laminated core pieces Wa are discharged while the stamping operation is suspended in the upstream punching structure 15A. During the discharging operation of the upstream punching structure 15A, the downstream punching structure 15B is in the stamping operation as shown in FIG. 9B, that is, is stamping core pieces Wa from the workpiece W. In contrast, in the downstream punching structure 15B, laminated core pieces Wa are discharged while the stamping operation is suspended as shown in FIG. 9A. During the discharging operation of the downstream punching structure 15B, the upstream punching structure 15A is in the stamping operation as shown in FIG. 9A, that is, is punching core pieces Wa from the workpiece W.

This embodiment therefore has the following advantages.

(1) The stamping-laminating apparatus includes the selecting mechanisms 37A, 37B. During a stamping operation, the selecting mechanisms 37A, 37B select one of the punching structures 15A, 15B to be put in a pause state. That is, one of the punching structures 15A, 15B to be put in a pause state is selected, and the other one of the punching structures 15A, 15B consecutively stamps core pieces Wa from the workpiece W and laminates the core pieces Wa. Also, one of the punching structures 15A, 15B that is in a pause state can discharge laminated pieces Wa the quantity of which is a predetermined number. That is, while one of the punching structures 15A, 15B is discharging stamped and laminated pieces Wa, the other one of the punching structures 15A, 15B is capable of punching core pieces Wa from the workpiece W and laminating the core pieces Wa, while applying lateral pressure and counter pressure to the core pieces Wa. Thus, unlike the prior art configuration, it is possible to continuously apply counter pressure to core pieces Wa, while other laminated core pieces Wa are being discharged. Therefore, product accuracy is prevented from deteriorating.

(2) Unlike a method for stopping punching or laminating core pieces Wa while laminated core pieces Wa are discharged, the present embodiment prevents productivity from being lowered.

Second Embodiment

A stamping-laminating apparatus according to a second embodiment of the present invention will now be described with reference to FIGS. 10A and 12D. In the description of the second and subsequent embodiments, the differences from the first embodiment will mainly be discussed.

The second embodiment is intended to prevent loss of material and loss of time that occur when the punches 20 are switched after stamping of a predetermined number (100 pieces) has been completed. In the first embodiment, as shown in FIG. 9A, after stamping a predetermined number of pieces is completed in the upstream punching structure 15A, the workpiece W has to be moved without being stamped by three pitches before stamping is started again in the downstream punching structure 15B. As shown in FIG. 9B, even if stamping at the punching structure 15A is started immediately after punching a predetermined number of pieces has been completed by the punching structure 15B, there is an unprocessed portion of the workpiece W located between the punching structures 15B, 15A. To avoid such drawbacks, the second embodiment, which has the same configuration as the first embodiment, has different operations for the actuators 40, which are controlled only by the controller 41. That is, the actuators 40 switch the operations of the selection switching cams 38A, 38B, thereby setting multiple switching patterns PT11 to PT14 as shown in FIGS. 10A to 10D.

Figure 10A:
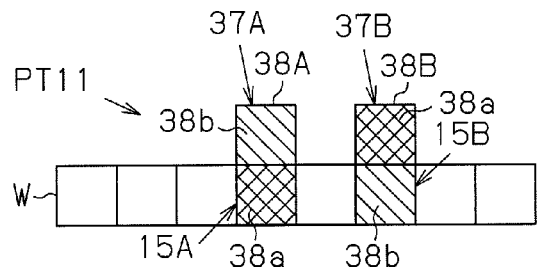
FIGS. 10A to 10D are schematic plan views showing switching patterns of a selection switching cam according to a second embodiment.
Figure 10B:
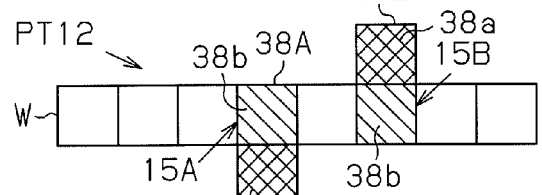
Figure 10C:
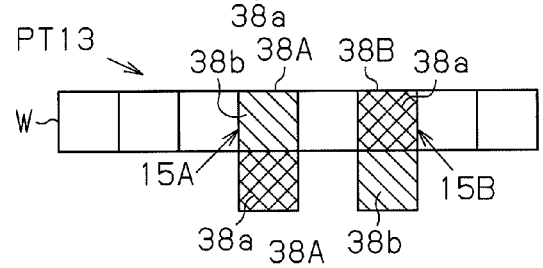
Figure 10D:
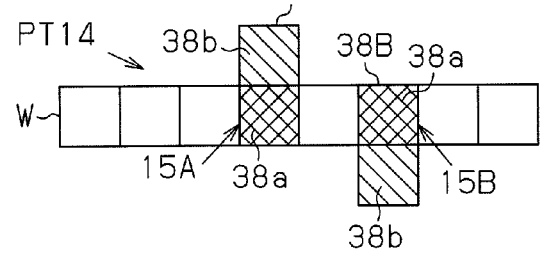

In the first switching pattern PT11 shown in FIG. 10A, the selection switching cam 38A of the upstream selecting mechanism 37A is at a stamping position, where the protruding cam surface 38*a* corresponds to the punch 20, and the selection switching cam 38B of the downstream selecting mechanism 37B is at a pause position, where the recessed cam surface 38*b* corresponds to the punch 20. In the second switching pattern PT12 shown in FIG. 10B, the selection switching cam 38A of the upstream selecting mechanism 37A is at the pause position, where the recessed cam surface 38*b* corresponds to the punch 20, and the selection switching cam 38B of the downstream selecting mechanism 37B is also at the pause position, where the recessed cam surface 38*b* corresponds to the punch 20. In the third switching pattern PT13 shown in FIG. 10C, the selection switching cam 38A of the upstream selecting mechanism 37A is at the pause position, where the recessed cam surface 38*b* corresponds to the punch 20, and the selection switching cam 38B of the downstream selecting mechanism 37B is at the stamping position, where the protruding cam surface 38*a* corresponds to the punch 20. In the fourth switching pattern PT14 shown in FIG. 10D, the selection switching cam 38A of the upstream selecting mechanism 37A is at a stamping position, where the protruding cam surface 38*a* corresponds to the punch 20, and the selection switching cam 38B of the downstream selecting mechanism 37B is also at the stamping position, where the protruding cam surface 38*a* corresponds to the punch 20.

Figure 11A:
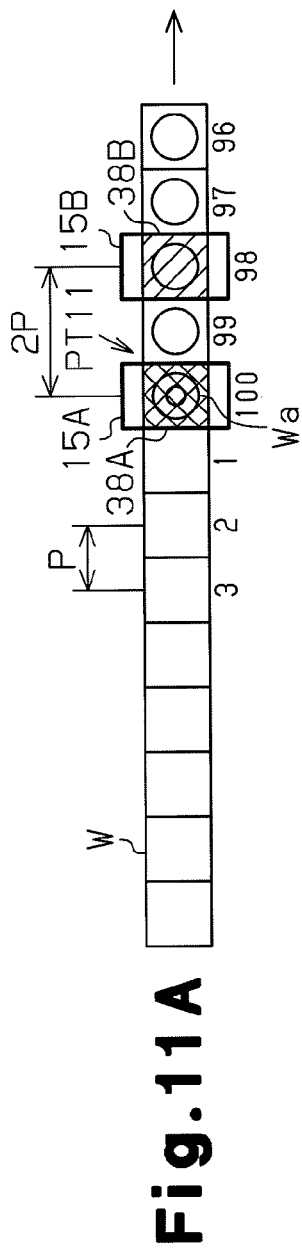
FIGS. 11A to 11D are explanatory diagrams showing stamping of workpieces.
Figure 11B:
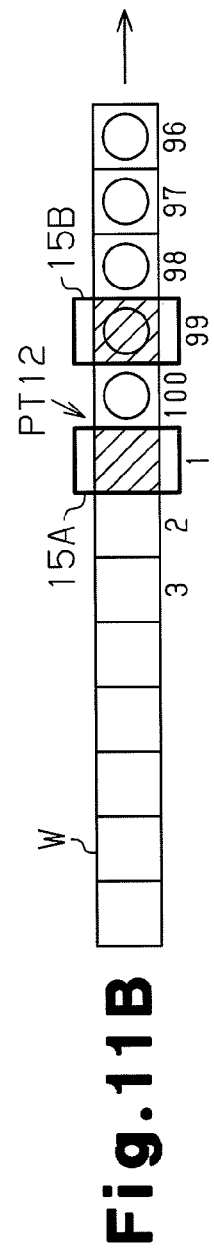

FIG. 11A illustrates a state in which the punch 20 of the upstream punching structure 15A has stamped a 100th core piece Wa. In this state, the selection switching cams 38A, 38B of the selecting mechanisms 37A, 37B are set at the first switching pattern PT11 shown in FIG. 10A. In this case, the upstream punching structure 15A performs punching, and the downstream punching structure 15B is put in pause state. Next, in synchronization of the one-pitch conveyance of the workpiece W, the selection switching cams 38A, 38B of the selecting mechanisms 37A, 37B are set at the second switching pattern PT12 in the state shown in FIG. 11B, so that the upstream and downstream punching structures 15A, 15B are put in a pause state. In the next one-pitch conveyance shown in FIG. 11C, the selection switching cams 38A, 38B of the selecting mechanisms 37A, 37B are set at the second switching pattern PT12, so that the upstream and downstream punching structures 15A, 15B are both put in a pause state. In synchronization of the subsequent one-pitch conveyance, the selection switching cams 38A, 38B of the selecting mechanisms 37A, 37B are set at the third switching pattern PT13 in the state shown in FIG. 11D, so that the upstream punching structure 15A is put in a pause state and the downstream punching structure 15B stamps a 101st core piece, which is consecutive to the 100th core piece. Accordingly, the upstream punching structure 15A is switched to a pause state from the time point corresponding to FIG. 11C, so that laminated core pieces Wa are discharged. In contrast, laminated core pieces Wa in the downstream punching structure 15B are discharged while the upstream punching structure 15A continues stamping and the downstream punching structure 15B continues to be in a pause state.

That is, FIG. 12A illustrates a state in which the punch 20 of the downstream punching structure 15B has stamped 98th core piece Wa. In this state, the selection switching cams 38A, 38B of the selecting mechanisms 37A, 37B are set at the third switching pattern PT13, so that the downstream punching structure 15B performs stamping and the upstream punching structure 15A is put in a pause state. Next, in synchronization of the one-pitch conveyance of the workpiece W, the selection switching cams 38A, 38B of the selecting mechanisms 37A, 37B are set at the fourth switching pattern PT14 in the state shown in FIG. 12B, so that the upstream and downstream punching structures 15A, 15B both perform stamping (99th and 1st core pieces). In the next one-pitch conveyance shown in FIG. 12C, the selection switching cams 38A, 38B of the selecting mechanisms 37A, 37B are set at the second switching pattern PT14, so that the upstream and downstream punching structures 15A, 15B perform punching (100th and 2nd core pieces). In synchronization of the next one-pitch conveyance, the selection switching cams 38A, 38B of the selecting mechanisms 37A, 37B are set at the first switching pattern PT11 in the state shown in FIG. 12D, so that the upstream punching structure 15A performs stamping and the downstream punching structure 15B is put in a pause state. Therefore, in the downstream punching structure 15B, laminated core pieces Wa are discharged concurrently with stamping of core pieces Wa from the time point shown in FIG. 12D.

The present embodiment therefore has the following advantages.

(3) As clearly shown in FIGS. 11A to 11D and 12A to 12D, the workpiece W has no unstamped portions or unprocessed portions. This prevents loss of material and loss of time.

Third Embodiment

A third embodiment of the present invention will now be described with reference to FIGS. 13A to 13D.

In the third embodiment, selection switching cams 38A, 38B of selecting mechanisms 37A, 37B are arranged along a direction perpendicular to the direction in which a workpiece W is conveyed, and connected to each other with a coupling portion 45. On the lower face of the selection switching cam 38A that corresponds to the upstream punching structure 15A, a protruding cam surface 38a, a recessed cam surface 38b, a protruding cam surface 38a, and a recessed cam surfaces 38b are formed in the order from the lower side as viewed in FIG. 13. On the lower face of the selection switching cam 38B that corresponds to the downstream punching structure 15B, a protruding cam surface 38a, a protruding cam surface 38a, and a recessed cam surface 38b are formed in this order from the lower side as viewed in FIG. 13.

Actuators 40 such as motors switch the selection switching cams 38A, 38B, thereby setting multiple (four, in the present embodiment) switching patterns PT21 to PT24 as shown in FIGS. 13A to 13D. That is, in the first switching pattern PT21 shown in FIG. 13A, the upstream selection switching cam 38A is at a stamping position, where the protruding cam surface 38a corresponds to the punch 20, and the downstream selection switching cam 38B is at a pause position, where the recessed cam surface 38b corresponds to the punch 20. In the second switching pattern PT22 shown in FIG. 13B, the upstream selection switching cam 38A is at the pause position, where the recessed cam surface 38b corresponds to the punch 20, and the downstream selection switching cam 38B is at the pause position.

Figure 13A:
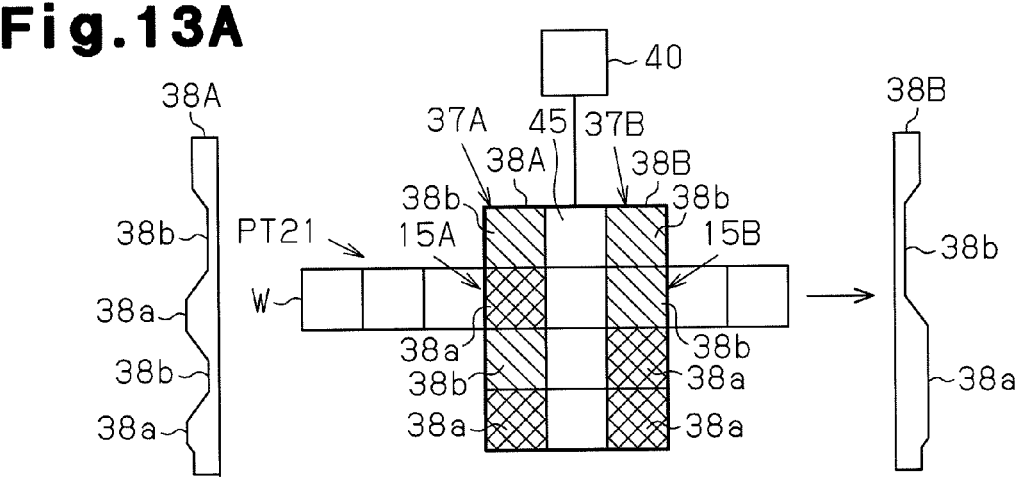
FIGS. 13A to 13D are schematic plan views showing switching patterns of selection switching cams according to a third embodiment.
Figure 13B:
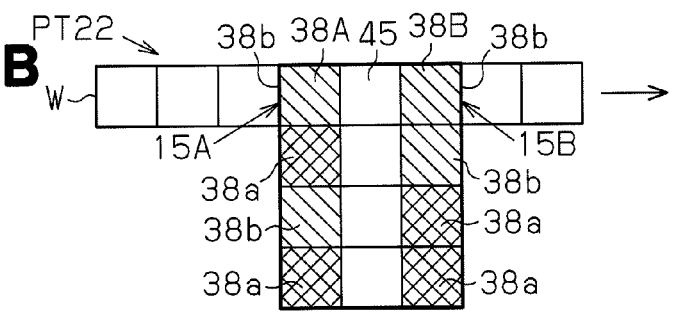
Figure 13C:
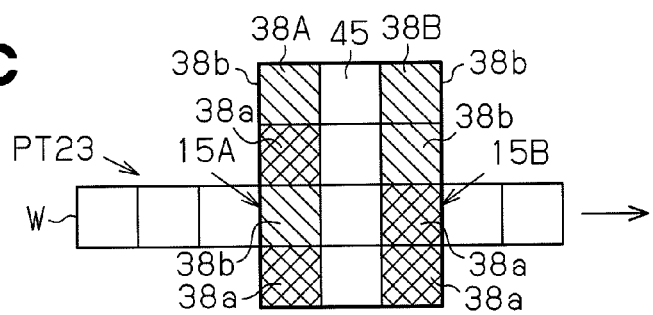
Figure 13D:
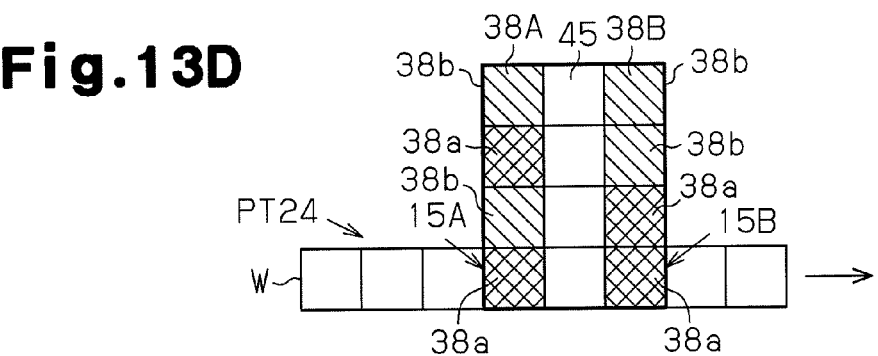

In a third switching pattern PT23 shown in FIG. 13C, the upstream selection switching cam 38A is switched to a pause position, and the downstream selection switching cam 38B is switched to a stamping position. In a fourth switching pattern PT24 shown in FIG. 13D, the upstream selection switching cam 38A is switched to the stamping position, and the downstream selection switching cam 38B is also switched to the stamping position. The switching patterns PT21 to PT24 are switched in the same order as in the second embodiment. Accordingly, the upstream and downstream punching structures 15A, 15B selectively perform stamping or are put in a pause state, so that core pieces Wa are consecutively stamped from a workpiece W without loss of material or loss of time.

The third embodiment has the following advantage in addition to the advantages of the second embodiment.

(4) Two selection switching cams 38A, 38B are coupled to each other so as to be moved integrally. This allows the selection switching cams 38A, 38B to be switched by a single actuator, and thus simplifies the structures of the selecting mechanisms 37A, 37B.

Fourth Embodiment

Figure 14A:
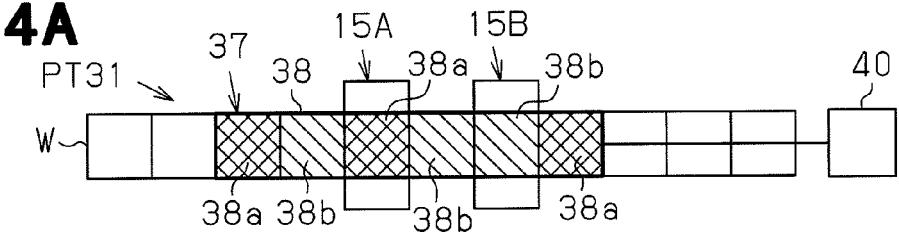
FIGS. 14A to 14D are schematic plan views showing switching patterns of selection switching cams according to a fourth embodiment.
Figure 14B:
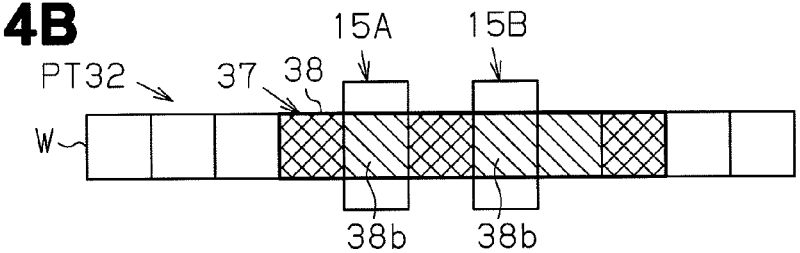
Figure 14C:
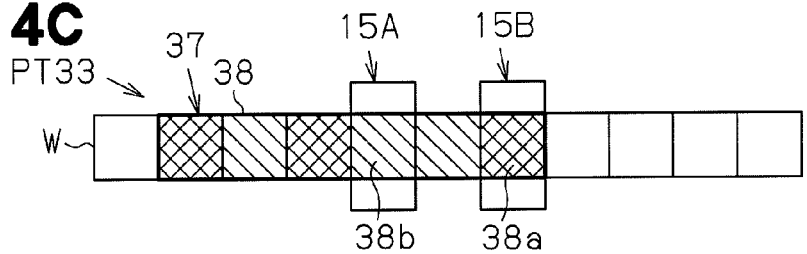
Figure 14D:
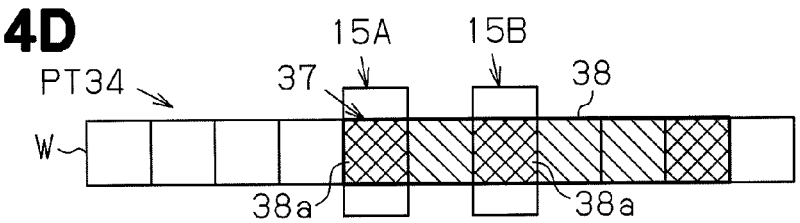

A stamping-laminating apparatus according to a fourth embodiment of the present invention will now be described with reference to FIGS. 14A and 14D.

The stamping-laminating apparatus according to the fourth embodiment has a single selecting mechanism 37, which corresponds to both of the upstream and downstream punching structures 15A, 15B. The selecting mechanism 37 includes a single selection switching cam 38, which is movable along a direction in which the workpiece W is conveyed. On the lower face of the selection switching cam 38, a protruding cam surface 38a, a recessed cam surface 38b, a protruding cam surface 38a, a recessed cam surface 38b, a recessed cam surface 38b, and a protruding cam surface 38a are formed in this order from the upstream end.

The selection switching cam 38 is switched among several positions by an actuator 40, which is, for example, a motor. Accordingly, several (four, in the present embodiment) switching patterns PT31 to PT34 are set as shown in FIGS. 14A to 14D. That is, in a first switching pattern PT31 shown in FIG. 14A, the upstream selection switching cam 38A is switched to the stamping position, and the downstream selection switching cam 38B is switched to the pause position. In the second switching pattern PT32 shown in FIG. 14B, the upstream and downstream selection switching cams 38A, 38B are both switched to a pause position. In a third switching pattern PT33 shown in FIG. 14C, the upstream selection switching cam 38A is switched to a pause position, and the downstream selection switching cam 38B is switched to a stamping position. In the fourth switching pattern PT34 shown in FIG. 14D, the upstream and downstream selection switching cams 38A, 38B are both switched to a stamping position.

The switching patterns PT31 to PT34 are switched in the same order as in the second embodiment shown in FIGS. 11A to 11D and 12A to 12D. Accordingly, the upstream and downstream punching structures 15A, 15B selectively perform stamping or are put in a pause state, so that core pieces Wa are consecutively stamped from a workpiece W without gaps.

In addition to the advantages of the second embodiment, the fourth embodiment has the following advantage.

(5) A single selecting mechanism 37 is arranged to correspond to both of the upstream and downstream punching structures 15A, 15B. The selecting mechanism 37 has a single selection cam 38. The structure of the selecting mechanism 37 is therefore simplified.

Fifth Embodiment

Figure 15:
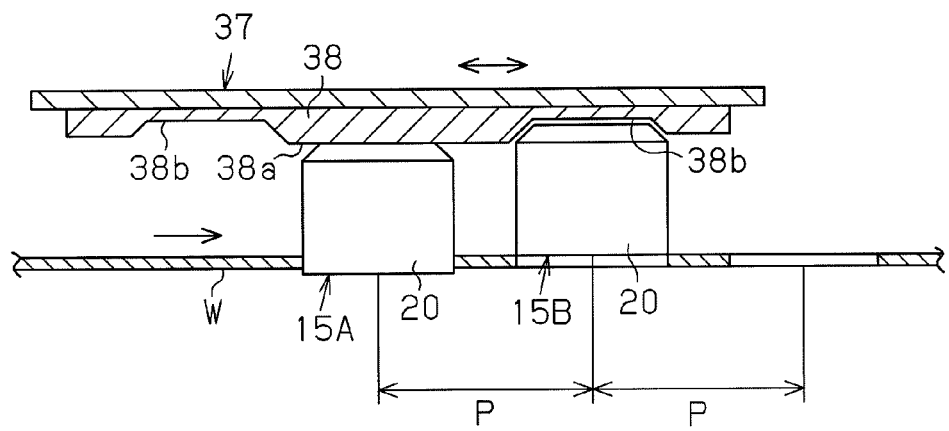
FIG. 15 is a cross-sectional view illustrating selection switching cams according to a fifth embodiment.

A stamping-laminating apparatus according to a fifth embodiment of the present invention will now be described with reference to FIG. 15.

In the fifth embodiment, an upstream punching structure 15A and a downstream punching structure 15B are arranged along the direction in which a workpiece W is conveyed at an interval equal to the conveyance pitch P. Also, a single selecting mechanism 37 is arranged to correspond to both of the upstream and downstream punching structures 15A, 15B. The selecting mechanism 37 includes a single selection switching cam 38, which is movable along a direction in which the workpiece W is conveyed. On the lower face of the selection switching cam 38, a recessed cam surface 38b, a protruding cam surface 38a, and a recessed cam surface 38b are formed. The recessed cam surface 38b, the protruding cam surface 38a, the recessed cam surface 38b are formed in the order from the upstream end toward the downstream end with respect to the conveyance direction of the workpiece W.

Through switching of the selection switching cam 38, the protruding cam surface 38a is arranged to correspond to one of the punching structures 15A, 15B. One of the punching structures 15A, 15B stamps core pieces Wa from the workpiece W. At this time, the recessed cam surface 38b is at a position corresponding to the other one of the punching structures 15A, 15B. One of the punching structures 15A, 15B that corresponds to the recessed cam surface 38b is put in a pause state, and laminated core pieces Wa are discharged during the pause. When the stamping operation is switched from the upstream punching structure 15A to the downstream punching structure 15B, part of the workpiece W that has been stamped by the upstream punching structure 15A is conveyed to a position that corresponds to the downstream punching structure 15B. Therefore, in the downstream punching structure 15B, blank stamping is performed until a part of the workpiece W that has already been stamped passes through.

In contrast, when the stamping operation is switched from the downstream punching structure 15B to the upstream punching structure 15A, no part of the workpiece W has been stamped. Thus, the stamping operation is started in the upstream punching structure 15A. In this case, at the start of the stamping operation by the upstream punching structure 15A, if the workpiece W is moved back by one pitch in a direction opposite to the conveyance direction such that the part on the workpiece W that has not been stamped faces the upstream punching structure 15A, the workpiece W can be stamped without any loss. In addition to the advantages of the first embodiment, the fourth embodiment has the following advantage.

(6) The number of protruding cam surfaces 38a and recessed cam surfaces 38b formed on the selection switching cam 38 can be reduced, the structure of the selecting mechanism 37 can be further simplified.

The above embodiments may be modified as follows.

Three or more punching structures may be arranged along the conveyance direction of the workpiece W.

Figure 11C:
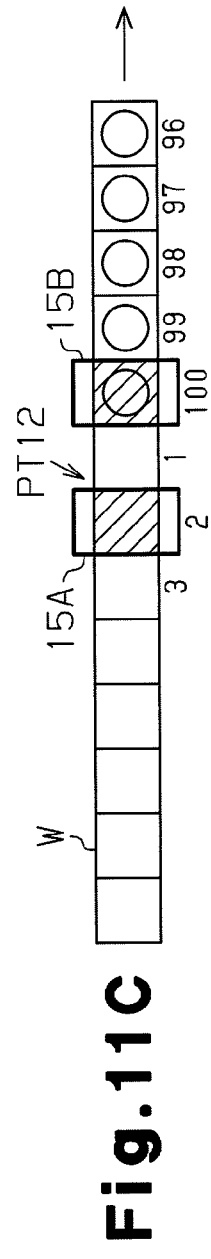
Figure 11D:
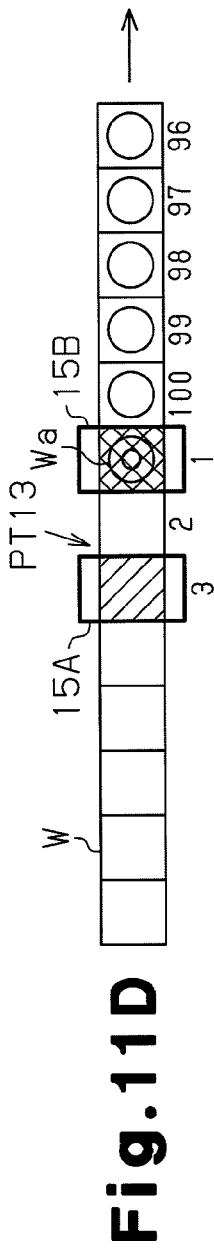

When the feed pitch of the workpiece W is regarded as the minimum unit, the upstream punching structure and the downstream punching structure may be spaced from each other by a distance greater than or equal to two pitches. In this case, the steps shown in FIGS. 11C and 12D can be repeated in accordance with the quantity of pitches corresponding to the space between the punching structures. For example, when the punching structures are arranged with two pitches in between, the steps shown in FIGS. 11C and 12D are repeated twice.

Figure 16:
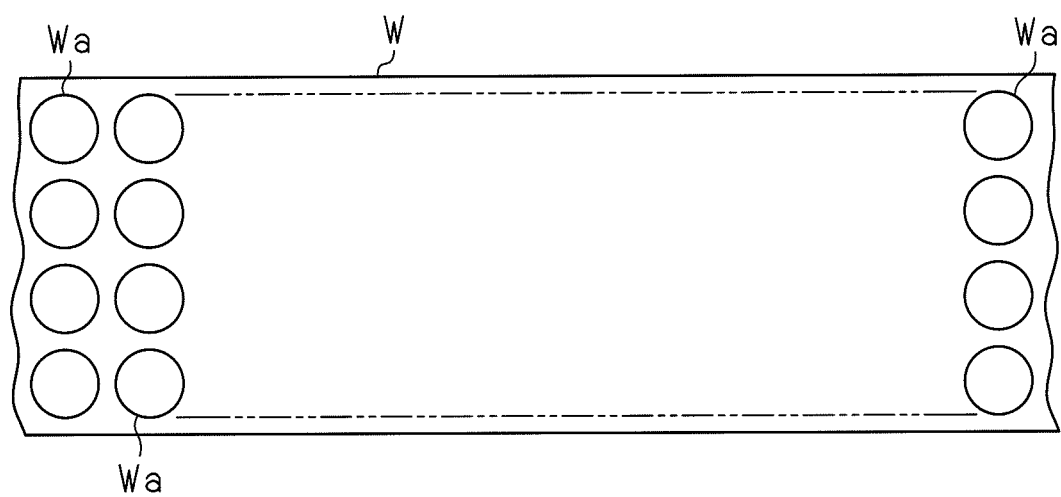
FIG. 16 is a schematic diagram showing a modification.

As clearly shown in FIG. 3, in each of the embodiments, stamping positions for core pieces Wa are arranged in a single line along the longitudinal direction of the hoop material. In contrast, as shown in FIG. 16, stamping positions for a plurality of core pieces Wa may be arranged along the widthwise direction of the workpiece W. In this case, the positions for punching on the core pieces Wa may be arranged along the widthwise direction of the workpiece W, or along a direction inclined with respect to the widthwise direction. The stamping positions may also be arranged randomly.

The invention claimed is:

1. A stamping-laminating apparatus forming stamped pieces from a workpiece, the apparatus comprising:
   a punching structure, the punching structure including a die, a punch that cooperates with the die to stamp a workpiece, a lateral pressure ring that applies lateral pressure to stamped pieces punched out from the workpiece, and a counter pressure applying mechanism that applies, to the stamped pieces, counter pressure toward the punch, wherein the workpiece is intermittently conveyed in one direction by a predetermined pitch, and the apparatus laminates the stamped pieces while applying the lateral pressure and the counter pressure to the stamped pieces, wherein:
   a plurality of said punching structures are included;
   the apparatus further comprising a selecting mechanism that selects a punching structure to be put in a pause state such that, among the punching structures, at least one punching structure is in a pause state during a stamping operation; and
   the selecting mechanism is comprised of a switching member including a constraining portion that constrains a punch relative to a lift mechanism and permitting portion that permits the punch to be lifted relative to the lift mechanism.

2. The stamping-laminating apparatus according to claim 1, wherein the punching structures are arranged along a direction in which the workpiece is conveyed.

3. The stamping-laminating apparatus according to claim 1, wherein the punching structures are arranged at a distance obtained by multiplying the conveyance pitch of the workpiece by an integer.

4. The stamping-laminating apparatus according to claim 1, wherein:
   when the switching member is moved, the punch that is constrained relative to the lift mechanism stamps the workpiece, and stamping by the punch that is permitted to be lifted relative to the lift mechanism is put in a pause state.

5. The stamping-laminating apparatus according to claim 4, further comprising an actuator that moves the switching member along the conveyance direction of the workpiece, wherein the constraining portion and the permitting portion are arranged along the conveyance direction of the workpiece.

* * * * *